(12) United States Patent
Cutler et al.

(10) Patent No.: US 8,369,827 B2
(45) Date of Patent: Feb. 5, 2013

(54) METHOD OF DETERMINING A UNIQUE SUBSCRIBER FROM AN ARBITRARY SET OF SUBSCRIBER ATTRIBUTES

(75) Inventors: Kevin Scott Cutler, Carp (CA); Hubert Holierhoek, Ottawa (CA)

(73) Assignee: Alcatel Lucent, Paris (FR)

( * ) Notice: Subject to any disclaimer, the term of this patent is extended or adjusted under 35 U.S.C. 154(b) by 401 days.

(21) Appl. No.: 12/794,100

(22) Filed: Jun. 4, 2010

(65) Prior Publication Data

US 2011/0302457 A1 Dec. 8, 2011

(51) Int. Cl.
*H04M 11/00* (2006.01)
(52) U.S. Cl. .................... 455/405; 455/406; 455/408
(58) Field of Classification Search .................. None
See application file for complete search history.

(56) References Cited

U.S. PATENT DOCUMENTS 5,852,812 A * 12/1998 Reeder ............................ 705/39
2008/0214173 A1* 9/2008 Preiss et al. ................... 455/419

* cited by examiner

*Primary Examiner* — Erika A Washington
(74) *Attorney, Agent, or Firm* — Kramer & Amado, P.C.

(57) ABSTRACT

Various exemplary embodiments relate to a subscriber profile repository (SPR) for determining a subscriber associated with a set of subscription identifiers. The subscriber profile repository may include: an interface which receives a subscriber profile request including at least one subscription identifier; a subscriber record database that includes a set of subscription identifiers; a subscriber record cache that contains a subset of the records contained in the subscriber record database; and a search manager that queries the subscriber record cache using each subscription identifier and queries the subscriber record database when the subscriber record cache does not contain a record matching a subscription identifier. The SPR may also include a results manager that compares subscriber records and updates the cache when a result is found in the subscriber records database. Various exemplary embodiments relate to a method performed by the SPR and a machine-readable medium including instructions for an SPR.

21 Claims, 5 Drawing Sheets

METHOD OF DETERMINING A UNIQUE SUBSCRIBER FROM AN ARBITRARY SET OF SUBSCRIBER ATTRIBUTES

TECHNICAL FIELD

Various exemplary embodiments disclosed herein relate generally to policy and charging in telecommunications networks.

BACKGROUND

As the demand increases for varying types of applications within mobile telecommunications networks, service providers must constantly upgrade their systems in order to reliably provide this expanded functionality. What was once a system designed simply for voice communication has grown into an all-purpose network access point, providing access to a myriad of applications including text messaging, multimedia streaming, and general Internet access. In order to support such applications, providers have built new networks on top of their existing voice networks. As seen in second and third generation networks, voice services must be carried over dedicated voice channels and directed toward a circuit-switched core, while other service communications are transmitted according to the Internet Protocol (IP) and directed toward a different, packet-switched core. This led to unique problems regarding application provision, metering and charging, and quality of experience (QoE) assurance.

In an effort to simplify the dual core approach of the second and third generations, the 3rd Generation Partnership Project (3GPP) has recommended a new network scheme it terms "Long Term Evolution" (LTE). In an LTE network, all communications are carried over an IP channel from user equipment (UE) to an all-IP core called the Evolved Packet Core (EPC). The EPC then provides gateway access to other networks while ensuring an acceptable QoE and charging a subscriber for their particular network activity.

The 3GPP generally describes the components of the EPC and their interactions with each other in a number of technical specifications. Specifically, 3GPP TS 29.212, 3GPP TS 29.213, and 3GPP TS 29.214 describe the Policy and Charging Rules Function (PCRF), Policy and Charging Enforcement Function (PCEF), and Bearer Binding and Event Reporting Function (BBERF) of the EPC. These specifications also mention a Subscriber Profile Repository (SPR) that interacts with the PCEF through an Sp interface. These specifications further provide some guidance as to how these elements interact in order to provide reliable data services and charge subscribers for use thereof.

For example, 3GPP TS 29.212, 29.213, and 29.214 specifications provide some guidance on PCC rule creation based on information contained in the SPR such as, for example, subscriber and service related data. These specifications, however, do not specify any details associated with the Sp reference point. Furthermore, the specifications do not specify the SPR's relation to any existing subscriber database.

In view of the foregoing, it would be desirable to provide SPR and method for processing requests to the SPR. In particular, it would be desirable to provide a system that is interoperable with different network devices and messages. Furthermore, it would be desirable to provide a system that can quickly resolve requests.

SUMMARY

In light of the present need for an SPR that is interoperable with different network devices that can quickly resolve requests, a brief summary of various exemplary embodiments is presented. Some simplifications and omissions may be made in the following summary, which is intended to highlight and introduce seine aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a Subscriber Profile Repository for determining a unique subscriber record from a set of subscription identifiers. The method may include receiving a message containing at least one subscription identifier; for each subscription identifier, determining whether the subscription identifier matches a subscriber record; and determining that a subscriber record is a unique subscriber record when each subscription identifier that matches a subscriber record matches the same subscriber record. The method may also include first querying a subscriber cache and querying a subscriber database for subscription identifiers not found in the subscriber cache. The method may update the subscriber cache with any records found in the subscriber database. The method may generate an error message when a set of subscription identifiers is associated with more than one subscriber record. Various exemplary embodiments relate to the above method encoded on a machine-readable medium as instructions for an SPR to determine a unique subscriber record from a set of subscription identifiers.

Various exemplary embodiments relate to a subscriber profile repository for determining a subscriber associated with a set of subscription identifiers. The subscriber profile repository may include: an interface which receives a subscriber profile request including at least one subscription identifier; a subscriber record database that includes a set of subscription identifiers, wherein no subscription identifier is repeated in the database; a subscriber record cache that contains a subset of the records contained in the subscriber record database; and a search manager that queries the subscriber record cache using each subscription identifier and queries the subscriber record database when the subscriber record cache does not contain a record matching a subscription identifier. The subscriber profile repository may also include a results manager that compares subscriber records and updates the subscriber records cache when a result is found in the subscriber records database.

It should be apparent that, in this manner, various exemplary embodiments enable a subscriber profile repository that identifies a unique subscriber associated with a set of subscription identifiers. In particular, by using a set of subscription identifiers, the SPR allows flexibility in messages and interoperability between devices. Furthermore, by using a subscriber records cache, the SPR can quickly resolve requests, especially for active subscriber records.

BRIEF DESCRIPTION OF THE DRAWINGS

In order to better understand various exemplary embodiments, reference is made to the accompanying drawings, wherein.

DETAILED DESCRIPTION

Figure 1:
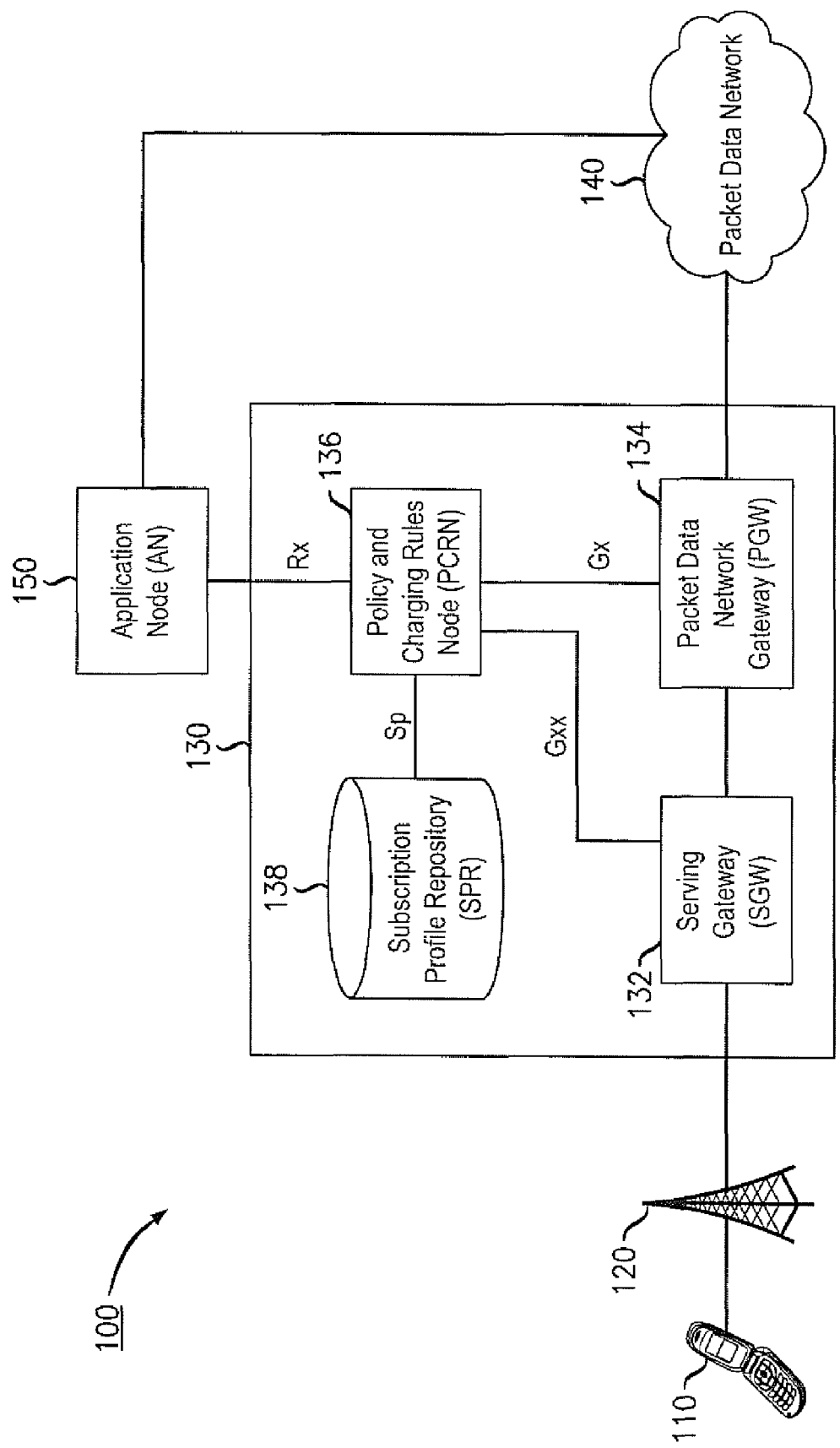
FIG. 1 illustrates an exemplary subscriber network for providing various data services.

Referring now to the drawings, in which like numerals refer to like components or steps, there are disclosed broad aspects of various exemplary embodiments.

FIG. 1 illustrates an exemplary subscriber network 100 for providing various data services. Exemplary subscriber network 100 may be a telecommunications network or other network for providing access to various services. Exemplary subscriber network 100 may include user equipment (UE) 110, base station 120, evolved packet core (EPC) 130, packet data network 140, and application node (AN) 150.

User equipment 110 may be a device that communicates with packet data network 140 for providing the end-user with a data service. Such data service may include, for example, voice communication, text messaging, multimedia streaming, and Internet access. More specifically, in various exemplary embodiments, user equipment 110 is a personal or laptop computer, wireless email device, cell phone, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by 3GPP standards. Thus, base station 120 may be a device that communicates with user equipment 110 via a first medium, such as radio communication, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with evolved packet core. In such embodiments, base station 120 may not be present.

Evolved packet core (EPC) 130 may be a device or network of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to the 3GPP TS 29.212, 29.213, and 29.214 standards. Accordingly, EPC 130 may include a serving gateway (SGW) 132, a packet data network gateway (PGW) 134, a policy and charging rules node (PCRN) 136, and a subscription profile repository (SPR) 138.

Serving gateway (SGW) 132 may be a device that provides gateway access to the EPC 130. SGW 132 may be the first device within the EPC 130 that receives packets sent by user equipment 110. SGW 132 may forward such packets toward PGW 134. SGW 132 may perform a number of functions such as, for example, managing mobility of user equipment 110 between multiple base stations (not shown) and enforcing particular quality of service (QoS) characteristics, such as guaranteed bit rate, for each flow being served. In various implementations, such as those implementing the Proxy Mobile IP (PMIP) standard, SGW 132 may include a Bearer Binding and Event Reporting Function (BBERF). In various exemplary embodiments, EPC 130 may include multiple SGWs (not shown) and each SGW may communicate with multiple base stations (not shown).

Packet data network gateway (PGW) 134 may be a device that provides gateway access to packet data network 140. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Thus, PGW 134 may be a policy and charging enforcement node (PCEN). PGW 134 may include a number of additional features such as, for example, packet filtering, deep packet inspection, and subscriber charging support.

Policy and charging rules node (PCRN) 136 may be a device that receives requests for services, generates PCC rules, and provides PCC rules to the PGW 134 and/or other PCENs (not shown). PCRN 136 may be in communication with AN 150 via an Rx interface. PCRN 136 may receive requests from AN 150, SGW 132, or PGW 134. Upon receipt of a service request, PCRN 136 may generate at least one new PCC rule for fulfilling the service request. PCRN 136 may communicate with SPR 138 via the Sp interface when creating PCC rules. PCRN 136 may, for example, use SPR 138 to obtain subscriber service data or to coordinate messages from multiple sources.

PCRN 136 may also be in communication with SGW 132 and PGW 134 via a Gxx and a Gx interface, respectively. Upon creating a new PCC rule or upon request by the PGW 134, PCRN 136 may provide a PCC rule to PGW 134 via the Gx interface. In various embodiments, such as those implementing the PMIP standard for example, PCRN 136 may also generate QoS rules. Upon creating a new QoS rule or upon request by the SGW 132, PCRN 136 may provide a QoS rule to SGW 132 via the Gxx interface.

Subscription profile repository (SPR) 138 may be a device that stores information related to subscribers to the subscriber network 100. Thus, SPR 138 may include a machine-readable storage medium such as read-only memory (ROM), random-access memory (RAM), magnetic disk storage media, optical storage media, flash-memory devices, and/or similar storage media. SPR 138 may be a component of PCRN 136 or may constitute an independent node within EPC 130. SPR 138 may also be distributed across a network, with some components within EPC 130 and other components connected via a network. Data stored by SPR 138 may include a plurality of subscriber identifier attributes of each subscriber and indications of subscription information for each subscriber such as, for example, bandwidth limits, charging parameters, subscriber priority, and subscriber service preferences.

Packet data network 140 may be any network for providing data communications between user equipment 110 and other devices connected to packet data network 140, such as AN 150. Packet data network 140 may further provide, for example, phone and/or Internet service to various user devices in communication with packet data network 140.

Application node (AN) 150 may be a device that includes an application function (AF) and provides an application service to user equipment 110. Thus, AN 150 may be a server or other device that provides, for example, a video streaming or voice communication service to user equipment 110. AN 150 may further be in communication with the PCRN 136 of the EPC 130 via an Rx interface. When AN 150 is to begin providing application service to user equipment 110, AN 150 may generate a request message, such as an AA-Request (AAR) according to the Diameter protocol, to notify the PCRN 136. This request message may include information such as an identification of the subscriber using the application service and an identification of the particular service data flows that must be established in order to provide the requested service. AN 150 may communicate such an application request to the PCRN 136 via the Rx interface.

Figure 2:
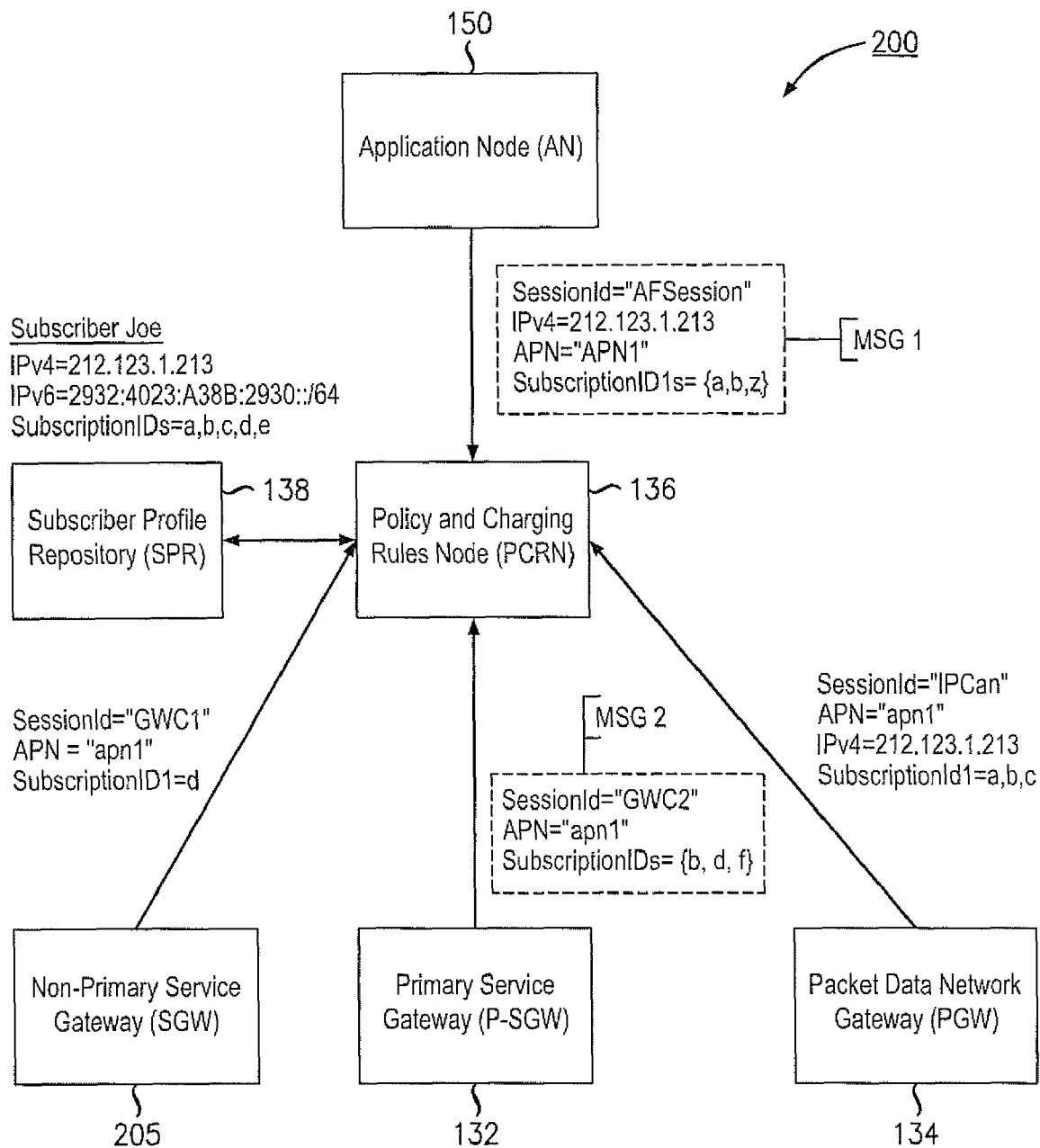
FIG. 2 illustrates an exemplary network for a PCRN receiving multiple related messages from a plurality of sources.

FIG. 2 illustrates an exemplary communications network 200, with a PCRN receiving multiple messages from a plurality of devices. Network 200 is similar to system 100, with application node (AN) 150, policy and charging rules node (PCRN) 136, packet data network gateway (PGW) 134, primary service gateway (P-SGW) 132, and subscriber profile repository (SPR) 138 corresponding to AN 150, PCRN 136, PGW 134, and SPR 138, respectively. Network 200 also includes an additional SGW, non-primary service gateway (NP-SGW) 205.

In network 200, multiple devices such as AN 150, PGW 134, P-SGW 132, and SGW 205 may communicate with PCRN 136 by sending multiple related messages. Each message may contain one or more subscription identifiers (SID) to identify a subscriber requesting a service. In various embodiments using the Diameter protocol, SIDs may be indicated using the Subscription-Id AVP. SIDs may include International Mobile Subscriber Identification (IMSI) numbers, Mobile Station International Subscriber Directory Numbers (MSISDN), Session Initiation Protocol Uniform Resource Indicators (SIP URI), Network Access Identifiers (NAI) or any other method of identifying network subscribers known in the art. To simplify the figures and examples, single letters are used to represent SIDs. A message may contain more than one type of SID and/or more than one instance of each type of SID. For example, MSG1 from AN 150 to PCRN 136 may include one SIP URI and two NAIs to identify a subscriber to which it wants to provide a service. Each device may use different SIDs to identify the same subscriber. For example, MSG2 from P-SGW 132 may include SIDs b, d and f whereas MSG1 may include SIDs a, b and z.

Having described the components of subscriber network 100, a brief summary of the operation of subscriber network 100 will be provided. It should be apparent that the following description is intended to provide an overview of the operation of subscriber network 100 and is therefore a simplification in some respects. The detailed operation of subscriber network 100 will be described in further detail below in connection with FIGS. 3-5.

PCRN 136 may generate PCC rules using information stored in SPR 138. PCRN 136 may communicate with SPR 138 to identify a unique subscriber record associated with the SIDs in a message. PCRN 136 may then use the information in the subscriber record to generate PCC rules. PCRN 136 may also use information stored in SPR 138 to determine whether a received message relates to any other message PCRN 136 has received. PCRN 136 may request a subscriber record from SPR 138 using the SIDs of each individual message then compare the results to determine if they are related to the same record. In various alternative embodiments, PCRN 138 may combine the contents of the messages into one request. SPR 138 may then return a single subscriber record if the contents of all the messages relate to the same subscriber record. PCRN 136 may then bind any related messages together, which may also include related messages sharing a common established session.

Figure 3:
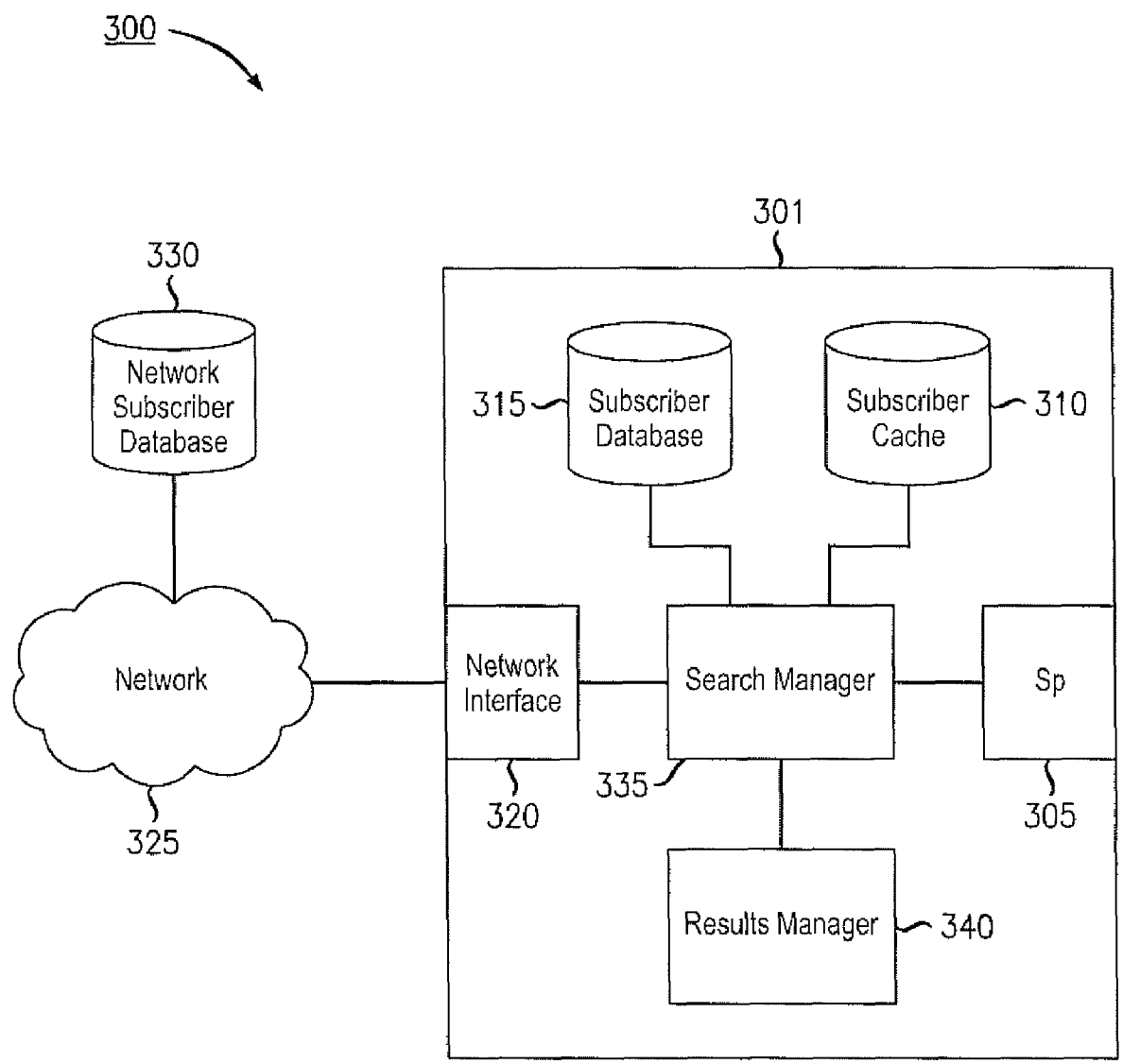
FIG. 3 illustrates an exemplary SPR for determining a unique subscriber record from a plurality of subscriber attributes.

FIG. 3 illustrates an exemplary SPR 300 for determining a unique subscriber record from a plurality of subscriber attributes. Exemplary SPR 300 may include SPR client 301, Sp interface 305, subscriber cache 310, subscriber database 315, network interface 320, network 325, network subscriber database 330, search manager 335 and results manager 340.

SPR client 301 may include hardware and/or executable instructions on a machine-readable storage medium configured to determine a unique subscriber record from a set of subscription identifiers. In various embodiments, SPR client 301 may be PCRN 136 or a component thereof. Alternatively, SPR client 301 may constitute an independent node within EPC 130. SPR client 301 may include Sp interface 305, subscriber cache 310, subscriber database 315, network interface 320, search manger 335 and results manager 340.

Sp interface 305 may be an interface comprising hardware and/or executable instructions encoded on a machine-readable storage medium configured to communicate with a PCRN such as PCRN 136. Sp interface 305 may receive record requests and transmit subscriber records. Record requests may include one or more subscriber identifiers. Subscriber records may include all information about a subscriber stored at SPR 300.

Subscriber cache 310 may be any machine-readable medium capable of storing subscriber records for quick access. Accordingly, subscriber cache 310 may include a machine-readable storage medium such as read-only memory (ROM), random-access memory (RAM), magnetic disk storage media, optical storage media, flash-memory devices, and/or similar storage media. Subscriber cache 310 may also be a data cache of a processor. Subscriber cache 310 may be collocated with PCRN 136 to allow quick access. Subscriber cache 310 may store a limited number of subscriber records to reduce search time. Subscriber cache may store subscriber records that have recently been requested by PCRN 136. Subscriber cache 310 may be cleared whenever there is a change to subscriber database 315 making the subscriber records inconsistent.

Subscriber database 315 may be any machine-readable medium capable of storing subscriber records. Accordingly, subscriber database 315 may include a machine-readable storage medium such as read-only memory (ROM), random-access memory (RAM), magnetic disk storage media, optical storage media, flash-memory devices, and/or similar storage media. Subscriber database 315 may store a subscriber record for every subscriber to subscriber network 100. In various embodiments, subscriber database 315 may not exist, in which case any queries directed to subscriber database 315 may be directed to network subscriber database 330 instead.

Network interface 320 may include hardware and/or executable instructions on a machine-readable storage medium configured to communicate with a network subscriber database 330 via a network 325. Network interface 320 may receive queries from search manager 335. Network interface 320 may forward queries to network subscriber database 330 via network 325. Network 325 may include any communications network known in the art for transmitting a database query such as, for example, the Internet, packet data network 140 or a private connection.

Network subscriber database 330 may be any machine-readable medium capable of storing subscriber records. Accordingly, network subscriber database 330 may include a machine-readable storage medium such as read-only memory (ROM), random-access memory (RAM), magnetic disk storage media, optical storage media, flash-memory devices, and/or similar storage media. Network subscriber database 330 may contain different subscriber records than subscriber database 315. For example, network subscriber database 330 may store subscriber records of subscribers to a different service provider. Queries directed to network subscriber database 330 may be slower than queries directed to subscriber database 315 because they must travel over network 325.

Search manager 335 may include hardware and/or executable instructions on a machine-readable storage medium configured to determine a subscriber record associated with a subscriber identifier. Search manager 335 may receive a list of subscriber identifiers from Sp interface 305. Search manager 335 may determine a matching subscriber record for a subscriber identifier by querying subscriber cache 310, subscriber database 315 and/or network subscriber database 330. Search manager 335 may first query subscriber cache 310. For each record request, search manager 335 may keep a list of found subscriber records and unfound subscriber identifiers. Search manager 335 may pass the list of found subscriber records to results manager 340. Search manager 335 may query subscriber database 315 and/or network subscriber database 330 for the list of unfound subscriber identifiers. Search manager 335 may then update subscriber cache 310 if subscriber database 315 and/or network subscriber database 330 returns a subscriber record for an unfound subscriber identifier. Search manager 335 may also send an updated list of found subscriber records to results manager 340.

Results manager 340 may include hardware and/or executable instructions on a machine-readable storage medium configured to compare subscriber records returned by subscriber cache 310, subscriber database 315, or network interface 320. Results manager 340 may compare found subscriber records to determine whether they identify the same unique subscriber. If any found subscriber records do not match, results manager 340 may generate an error message to inform PCRN 136 and/or other network components that the subscriber cannot be identified. Results manager 340 may also process an updated list of found subscriber records depending on the first list of found subscriber records. For example, if the first list was empty, results manager 340 may compare the records on the updated list to determine whether they identify the same unique subscriber. If the first list contained any subscriber records, results manager 340 may determine that any new results are inconsistent. Results manager 340 may then generate an error message to inform PCRN 136 and/or other network components that the subscriber cannot be identified.

Figure 4:
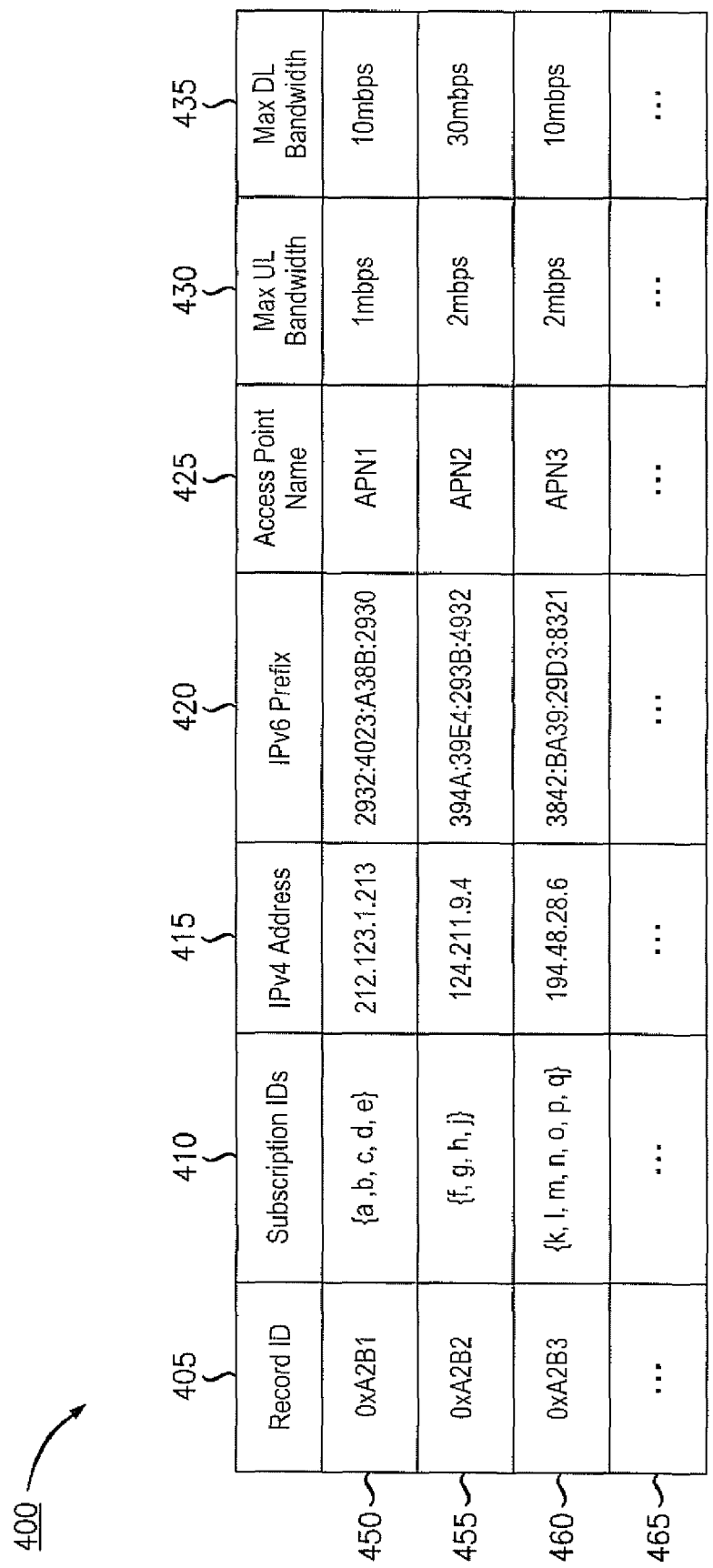
FIG. 4 illustrates an exemplary data arrangement for storing subscriber information.

FIG. 4 illustrates an exemplary data arrangement 400 for storing subscriber information. Data arrangement 400 may be a table in a database or cache such as subscriber cache 310, subscriber database 315 or network subscriber database 330. Alternatively, data arrangement 400 may be a series of linked lists, an array, or a similar data structure. Thus, it should be apparent that data arrangement 400 is an abstraction of the underlying data; any data structure suitable for storage of this data may be used.

Data arrangement 400 may include fields such as, for example, record ID 405, subscription IDs 410, IPv4 Address 415, IPv6 Prefix 420, Access Point Name 425, Max UL Bandwidth 430 and Max DL Bandwidth 435. Data arrangement 400 may include additional fields (not shown) required or useful for defining subscriber records such as, for example, charging parameters, guaranteed bitrates, and/or other subscriber information. Data arrangement 400 may include multiple subscriber records such as, for example, subscriber records 450, 455, and 460. Data arrangement 400 may also include additional entries 465 for additional subscribers.

Record ID 405 may be an identifier used by data structure 400 for identifying subscriber records. Record ID 405 may be used internally without communication to other network components.

Subscription IDs 410 may contain one or more subscription identifiers such as, for example, International Mobile Subscriber Identification number (IMSI), Mobile Station International Subscriber Directory Number (MSISDN), Session Initiation Protocol Uniform Resource Indicator (SIP URI), and/or a Network Access Identifier (NAI). Subscription IDs 410 may also include additional subscriber identifiers defined by other standards known in the art. An entry in Subscription IDs 410 may include zero or more of any type of subscription identifier. For example, an entry may include one IMSI and three MSISDNs. In various embodiments, a subscriber record may not include a subscriber identifier that is contained in another subscriber record.

IPv4 Address 415, IPv6 Prefix 420, Access Point Name 425, Max UL Bandwidth 430 and Max DL Bandwidth 435 may be considered subscriber data. Subscriber data may be used by network components to establish communications and charge for access. For example, subscriber data may be used by PCRN 136 to generate PCC rules.

Record 450 is a first example of a subscriber record. Record 450 indicates a subscriber record with a record ID of "0xA2B1." Record 450 contains five subscriber IDs: a, b, c, d and e. Record 450 also contains subscriber data such as an IPv4 address of 212.123.1.213, an IPv6 Prefix of 2932:4023:A38B:2930, an access point name of "APN1", a maximum upload bandwidth of 1 mbps and a maximum download bandwidth of 10 mbps.

Record 455 is a second example of a subscriber record. Record 455 indicates a subscriber record with a record ID of "0xA2B2." Record 455 contains four subscriber IDs: f, g, h and j. Record 455 also contains subscriber data such as an IPv4 address of 124.211.9.4, an IPv6 Prefix of 394A:39E4:293 B:4932, an access point name of "APN2", a maximum upload bandwidth of 2 mbps and a maximum download bandwidth of 30 mbps.

Record 460 is a third example of a subscriber record. Record 460 indicates a subscriber record with a record ID of "0xA2B3." Record 460 contains seven subscriber IDs: k, l, m, n, o, p, and q. Record 455 also contains subscriber data such as an IPv4 address of 194.48.28.6, an IPv6 Prefix of 3842:BA39:29D3:8321, an access point name of "APN3", a maximum upload bandwidth of 2 mbps and a maximum download bandwidth of 10 mbps.

Figure 5:
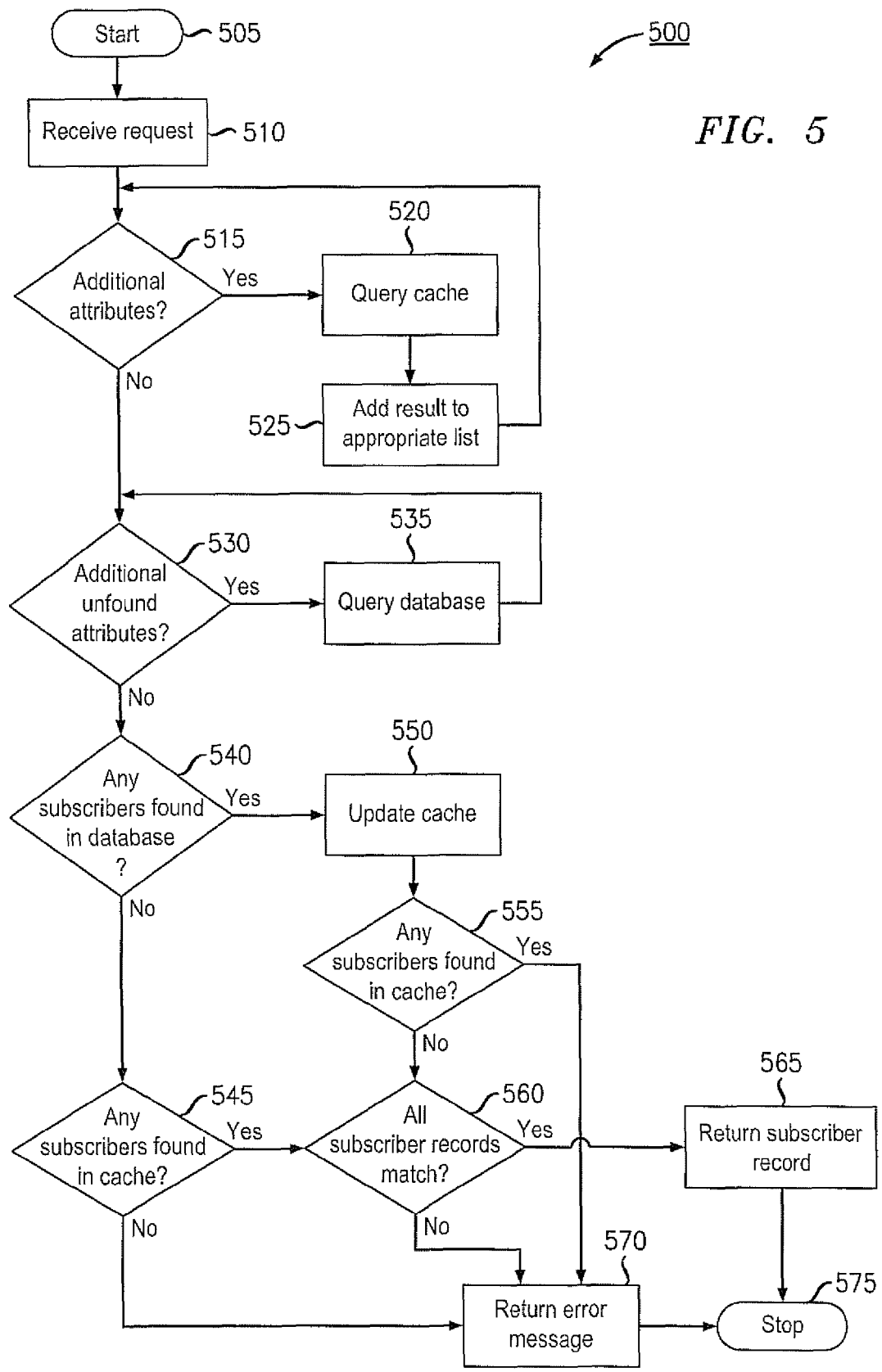
FIG. 5 illustrates an exemplary method for determining a unique subscriber record from a plurality of subscriber attributes.

FIG. 5 illustrates an exemplary method 500 for determining a unique subscriber record from a plurality of subscriber attributes. Method 500 may be performed by the components of SPR 300 to provide a unique subscriber record in response to a subscriber profile request from PCRN 136 or any other network component.

Method 500 may begin at step 505 and proceed to step 510 where Sp interface 305 of SPR 300 receives a subscriber profile request from a network component such as, for example, PCRN 136. Sp interface 305 may extract a list of subscriber identifiers from the subscriber profile request and pass the list to search manager 335. Method 500 may then proceed to step 515.

In step 515, search manager 335 may determine whether there are any subscriber identifiers in the list of subscriber identifiers to associate with a subscriber record. The first time method 500 reaches step 515, search manager 515 may assume there is a subscriber identifier. If the list of subscriber identifiers includes a subscriber identifier for which search manager 335 has not queried subscriber cache 310, method 500 may proceed to step 520. If there are no additional subscriber identifiers on the list, method 500 may proceed to step 530.

In step 520, search manager 335 may query subscriber cache 310 for a subscriber identifier. Subscriber cache 310 may return a subscriber record or an indication that the subscriber cache 310 contains no record associated with the subscriber identifier. The method may then proceed to step 525 where search manager 335 may add the result to an appropriate list. If subscriber cache 310 returns a subscriber record, search manager 335 may add the subscriber record to a list of found subscriber records. Alternatively, search manager 335 may only add the record to the list if it is not already present on the list. If subscriber cache 310 does not contain a record associated with the subscriber identifier, search manager 335 may add the subscriber identifier to a list of unfound subscriber identifiers. Alternatively, search manager 335 may mark the subscriber identifier in the original list as unfound. Method 500 may return to step 515 and repeat steps 520 and 525 for each subscriber identifier contained in the subscriber profile request.

In step 530, search manager 335 may determine whether there are any additional subscriber identifiers on the list of unfound subscriber identifiers. If there are additional subscriber identifiers, method 500 may proceed to step 535 where search manager 335 may query subscriber database 315 and/or network subscriber database 330. Search manager 335 may pass query results to results manager 340. If there are no additional subscriber identifiers, method 500 may proceed to step 540.

In step 540, results manager 340 may determine whether it has received any new subscriber records which were found in subscriber database 315 and/or network subscriber database 330. If any new subscriber record was found in a database, method 500 may proceed to step 550. If no new subscriber records were found in a database, method 500 may proceed to step 545.

In step 545, results manager 340 may determine whether any subscriber records were found in the subscriber cache 510. If the list of found subscriber records contains only records found in the subscriber cache 510, method 500 may proceed to step 560. If the list does not contain any subscriber records, method 500 may proceed to step 570 because search manager 335 found no records matching any of the subscriber identifiers in either the cache or a database.

In step 550, search manager 335 may update subscriber cache 310 with the new record so that it may be found more quickly the next time it is requested. In some embodiments, all records may be cached, while in other embodiments, records to be cached may be selected according to any method known to those of skill in the art. Search manager 335 may also delete records from subscriber cache 335 to free memory space for new records. Method 500 may then proceed to step 555.

In step 555, results manager 340 may determine whether any subscriber records were found in the subscriber cache 510. Results in both the cache and database may indicate an incomplete record in the subscriber cache 510. In various embodiments, incomplete records are not allowed in the subscriber cache 510. If the list of found subscriber records contains a record found in the subscriber cache 510, method 500 may proceed to step 570 because of incomplete or inconsistent records. If the cache does not contain any subscriber records, method 500 may proceed to step 560. In various alternative embodiments, incomplete records may be allowed in subscriber cache 510, and results manager 340 may skip this step and may proceed directly to step 560.

In step 560, results manager 340 may determine whether the subscriber records in the list of found subscriber records consistently identify a unique subscriber. Results manager 340 may determine that the subscriber record is unique if the list of found subscriber records contains only one subscriber record. If the list of found subscriber records contains more than one subscriber record, results manager 340 may compare each field of the subscriber records. Alternatively, results manager 340 may compare only a record ID of the records. If the found subscriber records consistently identify a unique subscriber, method 500 may proceed to step 565. If the found subscriber records do not consistently identify a unique subscriber, method 500 may proceed to step 570.

In step 565, Sp interface 305 may return the unique subscriber record to PCRN 136. Sp interface 305 may format the subscriber record to match a format used by PCRN 136. For example, Sp interface 305 may remove the record ID 405 if it is not used by PCRN 136.

In step 570, results manager 340 may generate an error message indicating that no subscriber records match the subscriber profile. The error message may include a results code indicating the reason for the error such as, for example, a subscriber identifier was not found in SPR 300 or the subscriber identifiers are inconsistent. SPR 300 may return this error message to the requesting network component via Sp interface 305. The method may then proceed to step 575, where the method ends.

Having described exemplary components and methods for the operation of exemplary subscriber network 100 and SPR 300, an example of the operation of exemplary network 100 and SPR 300 will now be provided with reference to FIGS. 1-5. SPR 138 may correspond to SPR 300. Data structure 400 may describe the contents of subscriber database 315 and/or network subscriber database 345. Subscriber cache 310 may begin with no subscriber records.

The process may begin when PCRN 136 receives MSG1 from AN 150. PCRN 136 may request a subscriber record matching MSG1 from SPR 138. In step 510, SPR 138 may receive the request via Sp interface 305, which may extract the SIDs, a, b, and z, from the message. In steps 515, 520 and 525, search manager 335 may then query subscriber cache 310 for each SID. Because subscriber cache 310 begins empty, none of the SIDs may be found in subscriber cache 310. In step 530 and 535, search manager 335 may then query subscriber database 315 and/or network subscriber database 345 with the same set of subscriber identifiers. If subscriber database 315 contains data arrangement 400, subscriber database 315 may return two copies of record 450: one for SID a and one for SID b. Subscriber database 315 may indicate that SID z was not found. In step 550 search manager 335 may then update subscriber cache 310 to include record 450. In step 560, results manager 340 may then compare the two copies of record 450 and determine that they are the same. SPR 300 may then return record 450 to PCRN 136 via Sp interface 305.

The process may begin again when PCRN 136 may later receive MSG2 from SGW 132. PCRN 136 may request a subscriber record matching MSG2 from SPR 138. SPR 138 may receive the request via Sp interface 305, which may extract the SIDS, b, d, and f, from MSG2. Search manager 335 may then query subscriber cache 310 for each subscriber identifier. Subscriber cache 310 may return record 450 for SID b because the record was added to the cache while processing MSG1. Search manager 335 may add record 450 to a list of found subscriber records. Subscriber cache 310 may also return record 450 for SID d, and search manager 335 may add a second copy of record 450 to the list of found subscriber records. Subscriber cache 310 may not find SID f, so SID f may be added to a list of unfound subscriber identifiers. In steps 530 and 535, search manager 335 may query subscriber database 315 for SID f. Record 455 contains SID f, so search manager 335 may add record 455 to subscriber cache 310 in step 550. In step 555, results manager 340 may determine that there is an error because there was a record in both subscriber cache 310 and subscriber database 315. Results manager 340 may then generate an error message because record 450 found in subscriber cache 310 for SIDs b and d does not match record 455 found in subscriber database 315 for SID f. Sp interface 305 may then return the error message to PCRN 136.

According to the foregoing, various exemplary embodiments provide for a subscriber profile repository that identifies a unique subscriber associated with a set of subscription identifiers. In particular, by using a set of subscription identifiers, the SPR allows flexibility in messages and interoperability between devices. Furthermore, by using a subscriber records cache, the SPR can quickly resolve requests, especially for active subscriber records.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method performed by a Subscriber Profile Repository (SPR) for determining a unique subscriber record from a set of subscription identifiers, the method comprising:
   receiving a message including at least one subscription identifier; for each subscription identifier of the at least one subscription identifier;
      determining whether the subscription identifier matches a subscriber record; and
      determining that the subscriber record is the unique subscriber record when each subscription identifier that matches the subscriber record matches an identical subscriber record.

2. The method of claim 1, wherein the step of determining whether the subscription identifier matches the subscriber record further comprises:
   querying a subscriber record cache for the subscription identifier;
   if the subscription identifier matches the subscriber record in the subscriber record cache, adding the matching subscriber record to a list of subscriber records; and
   if the subscription identifier does not match the subscriber record in the subscriber record cache, maintaining the subscription identifier in a list of unfound subscription identifiers.

3. The method of claim 2, wherein the at least one subscription identifier matches the subscriber record in the subscriber record cache, and the step of determining whether the subscription identifier matches the subscriber record further comprises:
   for each subscription identifier in the list of unfound subscription identifiers,
      querying a subscriber record database;
      if the subscription identifier matches the subscriber record in the subscriber record database, adding the matching subscriber record to the subscriber record cache; and
      returning an error message.

4. The method of claim 2, wherein the subscriber record cache does not include the subscriber record matching any subscription identifier, the method further comprising:
   for each subscription identifier:
      querying a subscriber record database, and
      if the subscriber record database contains the subscriber record matching the subscription identifier, adding the matching record to the subscriber record cache.

5. The method of claim 3, further comprising:
   clearing the subscriber record cache when there is a change to the subscriber record database.

6. The method of claim 1, further comprising:
   returning an error message when the subscription identifiers do not match any subscriber record.

7. The method of claim 1, further comprising:
   returning an error message when the subscription identifiers match more than one subscriber record.

8. The method of claim 1, wherein the set of subscription identifiers comprises at least one of:
   an International Mobile Subscriber Identification (IMSI);
   a Mobile Station International Subscriber Directory Number (MSISDN);
   a Session Initiation Protocol Uniform Resource Indicator (SIP URI); and
   a Network Access Identifier (NAI).

9. A subscriber profile repository for determining a subscriber associated with a set of subscription identifiers, the subscriber profile repository comprising:
   an interface which receives a subscriber profile request, the subscriber profile request comprising at least one subscription identifier;
   a subscriber record database that contains records of subscribers, each subscriber record comprising a set of subscription identifiers;
   a subscriber record cache that includes a subset of the subscriber records contained in the subscriber record database;
   a search manager that queries the subscriber record cache using each subscription identifier and queries the subscriber record database when the subscriber record cache does not contain a subscriber record matching a subscription identifier.

10. The subscriber profile repository of claim 9, further comprising:

a results manager that determines whether subscriber records are identical and returns the subscriber record via the interface when all query results are identical subscriber records.

11. The subscriber profile repository of claim 10, wherein the results manager updates the subscriber record cache when the subscriber record database produces a matching subscriber record.

12. The subscriber profile repository of claim 9, further comprising:
a network interface that transmits queries to a network subscriber database via a packet data network and receives query results from the network subscriber database.

13. The subscriber profile repository of claim 9, wherein the subscriber record comprises at least one of:
an International Mobile Subscriber Identification (IMSI);
a Mobile Station International Subscriber Directory Number (MSISDN);
a Session Initiation Protocol Uniform Resource Indicator (SIP URI); and
a Network Access Identifier (NAI).

14. A non-transitory machine-readable storage medium encoded with instructions for a Subscriber Profile Repository (SPR) to determine a unique subscriber record from a set of subscription identifiers, the machine-readable medium comprising:
instructions for receiving a message containing at least one subscription identifier;
instructions for determining, for each subscription identifier of the at least one subscription identifier, whether the subscription identifier matches a subscriber record; and
instructions for determining that the subscriber record is the unique subscriber record when each subscription identifier that matches the subscriber record matches an identical subscriber record.

15. The non-transitory machine-readable storage medium of claim 14, wherein the instructions for determining whether the subscription identifier matches the subscriber record further comprise:
instructions for querying a subscriber record cache for the subscription identifier;
instructions for adding the matching subscriber record to a list of subscriber records if the subscription identifier matches the subscriber record in the subscriber record cache; and
instructions for adding the subscription identifier to a list of unfound subscription identifiers if the subscription identifier does not match the subscriber record in the subscriber record cache.

16. The non-transitory machine-readable storage medium of claim 15, wherein at least one subscription identifier matches the subscriber record in the subscriber record cache, and the instructions for determining whether the subscription identifier matches the subscriber record further comprise:
instructions for querying a subscriber record database for each subscription identifier in the list of unfound subscription identifiers to determine whether the subscription identifier matches the subscriber record in the subscriber database; and
instructions for adding the matching subscriber record to the subscriber record cache and returning an error message if the subscription identifier matches the subscriber record in the subscriber record database.

17. The non-transitory machine-readable storage medium of claim 16, further comprising:
instructions for clearing the subscriber record cache when there is a change to the subscriber record database.

18. The non-transitory machine-readable storage medium of claim 15, wherein the subscriber record cache contains no subscriber records matching any subscription identifier, the machine-readable storage medium further comprising:
instructions for querying a subscriber record database for each subscription identifier; and
instructions for adding a matching record to the subscriber record cache if the subscriber record database contains the subscriber record matching the subscription identifier.

19. The non-transitory machine-readable storage medium of claim 14, further comprising:
instructions for returning an error message when the subscription identifiers do not match any subscriber record.

20. The non-transitory machine-readable storage medium of claim 14, further comprising:
returning an error message when the subscription identifiers match more than one subscriber record.

21. The non-transitory machine-readable storage medium of claim 14, wherein the set of subscriber identifiers comprises at least one of:
an International Mobile Subscriber Identification (IMSI);
a Mobile Station International Subscriber Directory Number (MSISDN);
a Session Initiation Protocol Uniform Resource Indicator (SIP URI); and
a Network Access Identifier (NAI).

* * * * *